(12) United States Patent
Takashima

(10) Patent No.: US 10,607,782 B2
(45) Date of Patent: Mar. 31, 2020

(54) CERAMIC ELECTRONIC DEVICE AND MANUFACTURING METHOD OF CERAMIC ELECTRONIC DEVICE

(71) Applicant: TAIYO YUDEN CO., LTD., Chuo-ku, Tokyo (JP)

(72) Inventor: Kenji Takashima, Takasaki (JP)

(73) Assignee: TAIYO YUDEN CO., LTD., Tokyo (JP)

(*) Notice: Subject to any disclaimer, the term of this patent is extended or adjusted under 35 U.S.C. 154(b) by 9 days.

(21) Appl. No.: 16/134,774

(22) Filed: Sep. 18, 2018

(65) Prior Publication Data

US 2019/0088415 A1 Mar. 21, 2019

(30) Foreign Application Priority Data

Sep. 21, 2017 (JP) .................................. 2017-181688
May 23, 2018 (JP) .................................. 2018-098775

(51) Int. Cl.
| | | |
|---|---|---|
| H01G 4/30 | (2006.01) | |
| H01G 4/008 | (2006.01) | |
| H01G 4/12 | (2006.01) | |
| H01G 4/224 | (2006.01) | |
| H01G 4/232 | (2006.01) | |

(52) U.S. Cl.
CPC .............. *H01G 4/30* (2013.01); *H01G 4/008* (2013.01); *H01G 4/12* (2013.01); *H01G 4/224* (2013.01); *H01G 4/2325* (2013.01)

(58) Field of Classification Search
CPC ............ H01G 4/30; H01G 4/008; H01G 4/12; H01G 4/224; H01G 4/2325
See application file for complete search history.

(56) References Cited

U.S. PATENT DOCUMENTS

| | | | |
|---|---|---|---|
| 2004/0217445 A1* | 11/2004 | Sakashita .............. | C04B 35/475 257/534 |
| 2006/0234022 A1* | 10/2006 | Liu ......................... | H01G 2/22 428/210 |
| 2009/0191418 A1 | 7/2009 | Nakano et al. | |
| 2012/0056709 A1* | 3/2012 | Kajino ................. | C01G 31/006 338/22 R |

(Continued)

FOREIGN PATENT DOCUMENTS

| | | |
|---|---|---|
| JP | 2004186502 A | 7/2004 |
| JP | 2004311676 A | 11/2004 |

(Continued)

*Primary Examiner* — Dion Ferguson
(74) *Attorney, Agent, or Firm* — Law Office of Katsuhiro Arai

(57) ABSTRACT

A ceramic electronic device includes: a ceramic main body that has at least two edge faces facing each other, has an internal electrode layer inside thereof and has a parallelepiped shape; and external electrodes formed on the two edge faces, wherein: the external electrodes have at least a plated layer; an oxide film of a metal for plating of the plated layer on a region that is a part of at least one of four side faces of the ceramic main body other than the two edge faces, the region not being covered with the external electrodes; and a ratio of (a peak area of an oxide of the metal for plating)/(a peak area of the metal for plating) is 13.1 or more in a photoelectron spectrum of an outermost surface of the oxide film.

10 Claims, 13 Drawing Sheets

(56) References Cited

U.S. PATENT DOCUMENTS

| | | | | |
|---|---|---|---|---|
| 2016/0086733 A1* | 3/2016 | Saito | .................... | H01G 4/0085 |
| | | | | 361/301.4 |
| 2016/0090661 A1* | 3/2016 | Kitada | ................. | H01C 1/1406 |
| | | | | 338/22 R |
| 2016/0126014 A1* | 5/2016 | Lee | .......................... | H01G 4/30 |
| | | | | 361/301.4 |
| 2016/0204320 A1* | 7/2016 | Konishi | ................. | C25D 11/04 |
| | | | | 257/98 |
| 2018/0124904 A1* | 5/2018 | Cho | ....................... | H01G 4/002 |

FOREIGN PATENT DOCUMENTS

| | | | |
|---|---|---|---|
| JP | 2005251993 A | 9/2005 |
| JP | 2007242995 A | 9/2007 |
| JP | 2008244119 A | 10/2008 |
| JP | 2008251630 A | 10/2008 |
| JP | 2009177085 A | 8/2009 |

\* cited by examiner

CERAMIC ELECTRONIC DEVICE AND MANUFACTURING METHOD OF CERAMIC ELECTRONIC DEVICE

CROSS-REFERENCE TO RELATED APPLICATION

This application is based upon and claims the benefit of priority of the prior Japanese Patent Application No. 2017-181688, filed on Sep. 21, 2017 and the prior Japanese Patent Application No. 2018-098775, filed on May 23, 2018, the entire contents of which are incorporated herein by reference.

FIELD

A certain aspect of the present invention relates to a ceramic electronic device and a manufacturing method of a ceramic electronic device.

BACKGROUND

Ceramic electronic devices such as a multilayer ceramic capacitor are widely used as electronic devices having a small size, a large capacity and high reliability. The number of the ceramic electronic devices is large among electrical devices and electronic devices. Recently, as devices are downsized and performance of the devices gets higher, it is increasingly demanded that ceramic electronic devices have a small size, a large capacity and high reliability.

In the ceramic electronic devices, external electrodes are formed by a plating process in order to improve jointing between substrate terminals and the ceramic electronic devices during mounting. However, a metal for plating may be bonded to a part of a surface of a ceramic body that is not covered with the external electrodes, during the plating process. As the ceramic electronic devices are downsized, a distance between facing external electrodes gets shorter in a small product. When even a little amount of the metal for plating is bonded to the surface of the ceramic body of the small product, a leak current path is formed. Therefore, an insulating resistance may be remarkably reduced. And so, there are disclosed a technology for preventing bonding of the metal for plating (for example, see Japanese Patent Application Publication No. 2004-311676, Japanese Patent Application Publication No. 2007-242995, Japanese Patent Application Publication No. 2009-177085, Japanese Patent Application Publication No. 2008-251630, Japanese Patent Application Publication No. 2008-244119 and Japanese Patent Application Publication No. 2005-251993).

SUMMARY OF THE INVENTION

However, the technology of Japanese Patent Application Publication No. 2004-311676, Japanese Patent Application Publication No. 2007-242995 and Japanese Patent Application Publication No. 2009-177085 needs time and cost. For example, when a protection layer of an insulating material such as glass is formed on an edge face of internal electrodes or a surface of external electrodes, it is necessary to remove the protection layer of the edge face and the surface. In the product of the small size, a very difficult work is needed in order to selectively remove a coated layer. The technology of Japanese Patent Application Publication No. 2008-251630, Japanese Patent Application Publication No. 2008-244119 and Japanese Patent Application Publication No. 2005-251993 cannot completely prevent the bonding of the metal for plating. In the ceramic electronic devices in which downsizing and high reliability are required, a little amount of the bonded metal for plating may have large influence on insulating property.

The present invention has a purpose of providing a ceramic electronic component and a manufacturing a ceramic electronic component that are capable of suppressing influence of a metal for plating with a simple method.

According to an aspect of the present invention, there is provided a ceramic electronic device including: a ceramic main body that has at least two edge faces facing each other, has an internal electrode layer inside thereof and has a parallelepiped shape; and external electrodes formed on the two edge faces, wherein: the external electrodes have at least a plated layer; an oxide film of a metal for plating of the plated layer on a region that is a part of at least one of four side faces of the ceramic main body other than the two edge faces, the region not being covered with the external electrodes; and a ratio of (a peak area of an oxide of the metal for plating)/(a peak area of the metal for plating) is 13.1 or more in a photoelectron spectrum of an outermost surface of the oxide film.

According to another aspect of the present invention, there is provided a manufacturing method of a ceramic electronic device including: preparing a ceramic main body that has at least two edge faces facing each other, has an internal electrode layer inside thereof, has a parallelepiped shape and has ground layers formed from the two edge faces toward at least one of four side faces of the ceramic main body other than the two edge faces, a main component of the ground layer being a metal; forming a plated layer on the ground layer by a plating process; and oxidizing a surface of a bonded film of a metal for plating after the plating process, the bonded film being spaced from the ground layer.

DETAILED DESCRIPTION

A description will be given of an embodiment with reference to the accompanying drawings.

Embodiment

Figure 1:
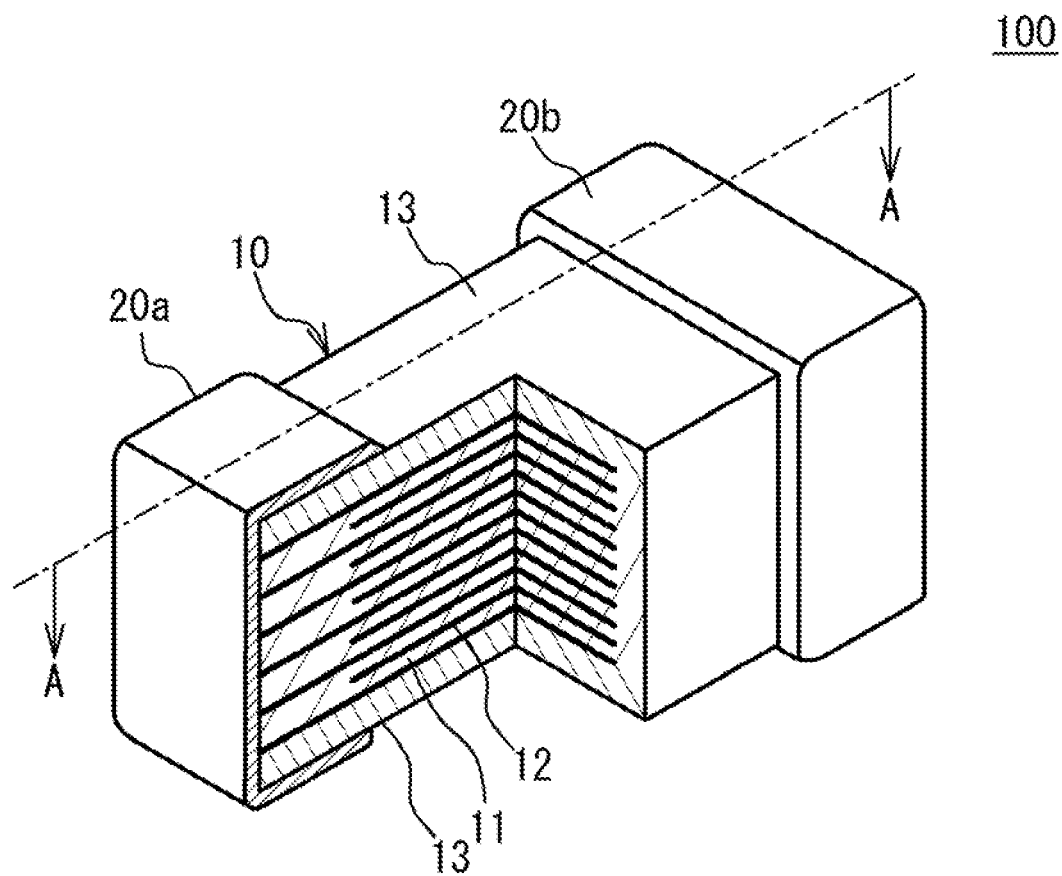
FIG. 1 illustrates a partial perspective view of a multilayer ceramic capacitor.

A description will be given of a multilayer ceramic capacitor. FIG. 1 illustrates a partial perspective view of a multilayer ceramic capacitor 100 in accordance with an embodiment. As illustrated in FIG. 1, the multilayer ceramic capacitor 100 includes a multilayer chip (ceramic main body) 10 having a rectangular parallelepiped shape, and a pair of external electrodes 20a and 20b that are respectively provided at two edge faces of the multilayer chip 10 facing each other. Four faces other than the two edge faces of the multilayer chip 10 are referred to as side faces. The external electrodes 20a and 20b extend to the four side faces. However, the external electrodes 20a and 20b are spaced from each other on the four side faces.

The multilayer chip 10 has a structure designed to have dielectric layers 11 and internal electrode layers 12 alternately stacked. A main component of the dielectric layer 11 is a ceramic material acting as a dielectric material. A main component of the internal electrode layers 12 is a metal material such as a base metal material. End edges of the internal electrode layers 12 are alternately exposed to a first edge face of the multilayer chip 10 and a second edge face of the multilayer chip 10 that is different from the first edge face. In the embodiment, the first face faces with the second face. The external electrode 20a is provided on the first edge face. The external electrode 20b is provided on the second edge face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In the multilayer chip 10, cover layers 13 cover two of the four side faces that correspond to an upper face and a lower face in a stacking direction of the dielectric layers 11 and the internal electrode layers 12 (hereinafter referred to as a stacking direction). A main component of the cover layer 13 is a ceramic material. For example, a main component material of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. A thickness of the internal electrode layer 12 is, for example, 0.5 µm or less. It is preferable that the thickness of the internal electrode layer 12 is 0.3 µm or less. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure.

Figure 2:
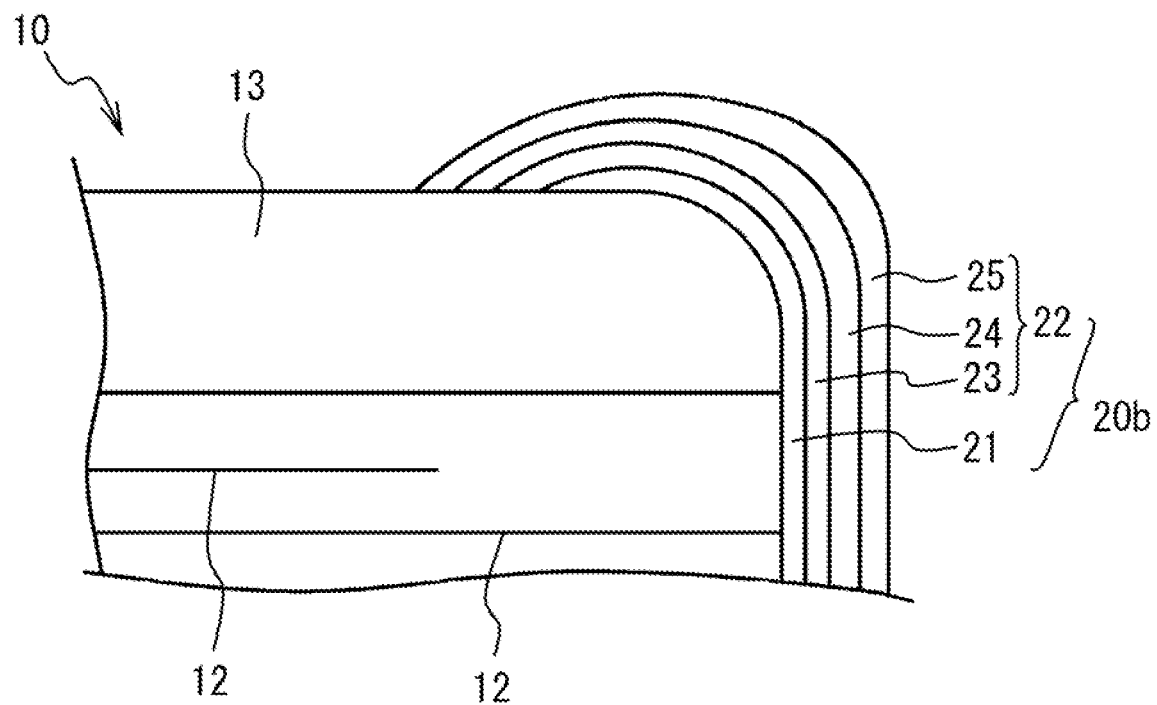
FIG. 2 illustrates a partial cross sectional view of an external electrode that is taken along a line A-A of FIG. 1.

FIG. 2 illustrates a cross sectional view of the external electrode 20b and is a cross sectional view taken along a line A-A of FIG. 1. In FIG. 2, hatching for cross section is omitted. On a surface of the multilayer chip 10, a ceramic material is mainly exposed. Therefore, it is difficult to form a plated layer on the surface of the multilayer chip 10 without a ground layer. And so, as illustrated in FIG. 2, the external electrode 20b has a structure in which a plated layer 22 is formed on a ground layer 21 formed on the surface of the multilayer chip 10.

A main component of the ground layer 21 is a metal such as Cu, Ni, Al (aluminum) or Zn (zinc). Alternatively the main component of the ground layer 21 is an alloy of the metals (for example, an alloy of Cu and Ni). The ground layer 21 includes a glass component for densifying the ground layer 21 or a co-material for controlling sinterability of the ground layer 21. The glass is an oxide of Ba, Sr, Ca, Zn, Al, Si (silicon), B (boron) or the like. The co-material is a ceramic component of which a main component is the same as that of the dielectric layers 11.

A main component of the plated layer 22 is a metal such as Cu, Ni, Al, Zn, Sn (tin) or an alloy of them. The plated layer 22 may be a plated layer of a single metal component or may include a plurality of plated layers having a different metal. For example, the plated layer 22 has a structure in which a first plated layer 23, a second plated layer 24 and a third plated layer 25 are formed on the ground layer 21 in this order. The ground layer 21 and the plated layer 22 cover both of the edge faces of the multilayer chip 10 and extend to at least one of the four side faces of the multilayer chip 10. In the embodiment, the ground layer 21 and the plated layer 22 extend to the four side faces from both of the edge faces of the multilayer chip 10. The first plated layer 23 is, for example, a Cu-plated layer. The second plated layer 24 is, for example, a Ni-plated layer. The third plated layer 25 is, for example, a Sn-plated layer. In FIG. 2, the external electrode 20b is illustrated. The external electrode 20a has the same structure as the external electrode 20b.

The plated layer 22 is formed by a plating process. During the plating process, a part of the side faces of the multilayer chip 10 that is covered by neither the external electrodes 20a nor 20b is put into plating solution. In this case, a metal for plating may be bonded to the part. In particular, in a case where the plated layer 22 has a large thickness in order to improve bonding strength between the plated layer 22 and a substrate terminal during mounting of the multilayer ceramic capacitor 100, when the plated layer 22 having a sufficient thickness is formed, the metal for plating is easily bonded to the part. As ceramic electronic devices are downsized, a distance between facing external electrodes gets shorter in a small product. When even a little amount of a metal for plating is bonded to a surface of a ceramic main body of the small product, a leak current path is formed. Therefore, an insulating resistance may be remarkably reduced. And so, the multilayer ceramic capacitor 100 has a structure for suppressing influence of the metal for plating.

Figure 3:
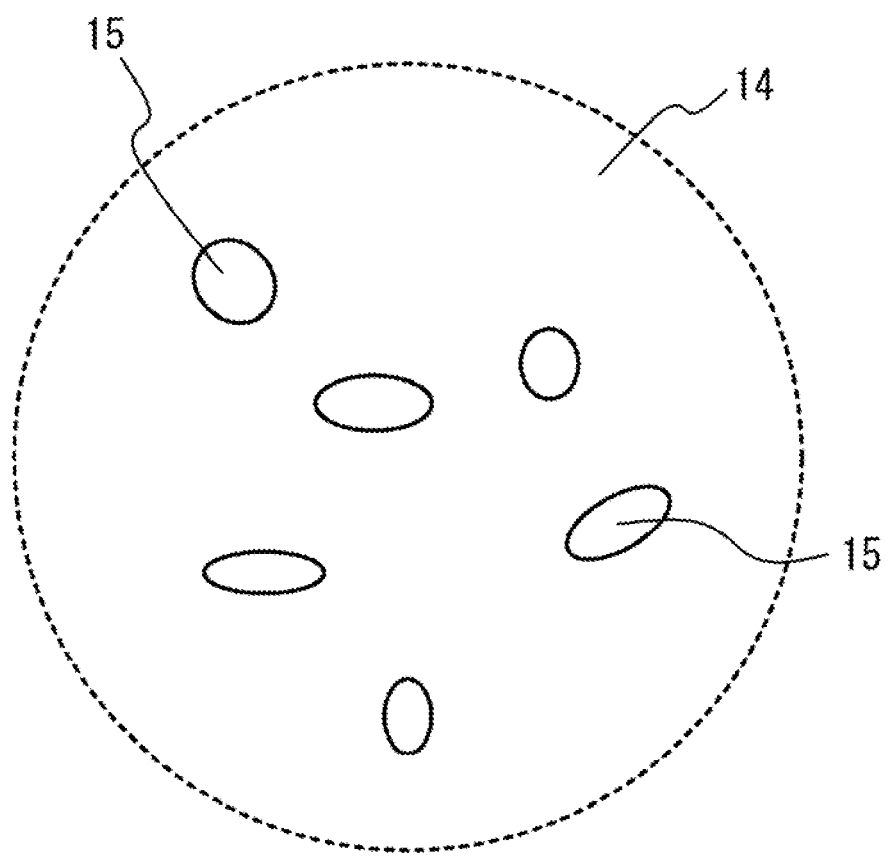
FIG. 3 schematically illustrates an enlarged view of an exposed face.

FIG. 3 schematically illustrates an enlarged view of one of the side faces of the multilayer chip 10 that is covered with neither the external electrodes 20a nor 20b. The one of the side faces is referred to as an exposed face 14. As illustrated in FIG. 3, on the exposed face 14, a bonded film (oxide film) 15 is bonded. The bonded film 15 is bonded during forming of the plated layer 22. Therefore, the bonded film 15 includes at least one of the metals included in the plated layer 22. The bonded film 15 is spaced from the external electrodes 20a and 20b. A plurality of bonded films 15 may be bonded and may be spaced from each other.

In the embodiment, at least a part of the bonded film 15 is an oxide phase. Therefore, on the exposed face 14, all of the bonded film 15 may not be necessarily an oxide phase. For example, a part of the bonded film 15 may not be an oxide but a metal.

In concrete, in the embodiment, in a photoelectron spectrum measured by an XPS (X-ray Photoelectron Spectroscopy Analysis) with respect to the outermost surface of the bonded film 15, an oxidation degree=(a peak area of an oxide of the metal for plating)/(a peak area of the metal for plating) is 13.1 or more. In the structure, the metal for plating of the outermost surface of the bonded film 15 is sufficiently oxidized. Therefore, an insulating resistance of the bonded film 15 is sufficiently large. It is therefore possible to suppress the reduction of the insulating resistance of the multilayer ceramic capacitor 100. The bonded film 15 is formed by oxidizing the metal for plating. It is therefore possible to suppress the influence of the metal for plating by a simple method. The larger the oxidation degree is, the larger the insulating resistance of the bonded film 15 is. It is therefore preferable that the oxidation degree of the outermost surface of the bonded film 15 is 15 or more. It is more preferable that the oxidation degree of the outermost surface of the bonded film 15 is 20 or more.

Figure 4:
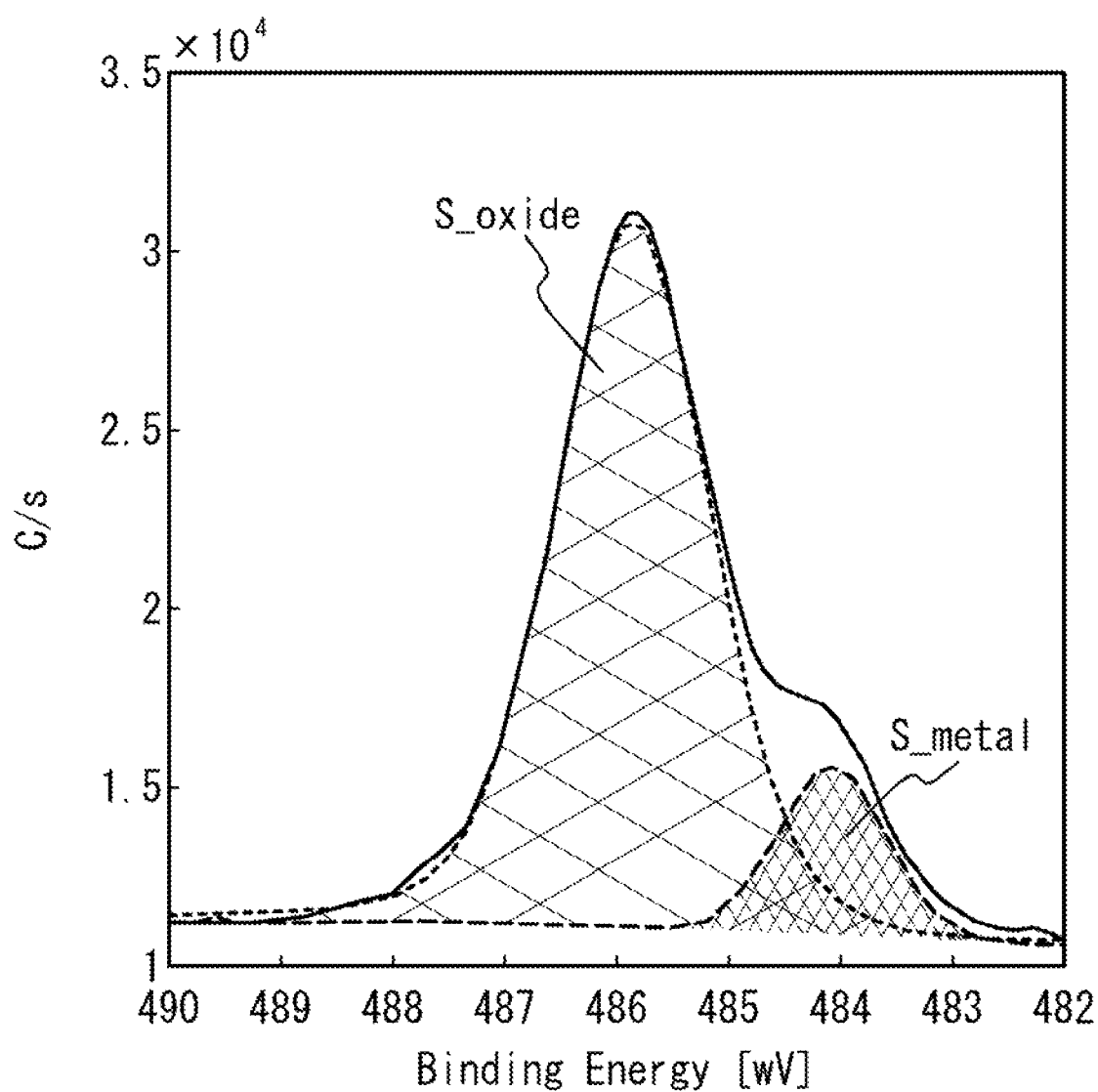
FIG. 4 illustrates a photoelectron spectrum.

FIG. 4 illustrates the photoelectron spectrum. In FIG. 4, a horizontal axis indicates bound energy. A vertical axis indicates strength of photoelectron. As illustrated in FIG. 4, a peak of the metal for plating and a peak of the oxide of the metal for plating are measured. Background is subtracted from the spectrum with use of a straight-line method, a Shirley method, a Tougaard method or the like. And the two peaks are separated from each other by two Gauss functions, two Lorentz function, two Voigt functions or the like. It is therefore possible to calculate the areas of the two peaks. The peak area of the metal for plating is referred to as S_metal. The area of the peak of the oxide of the metal for plating is referred to as S_oxide. For example, when Sn is notified as the metal for plating, the area having a local maximum value in a range of 484.5 to 485.4 eV with respect to the peak of which the area is calculated is S_metal, and the area having a local maximum value in a range of 485.4 to 487 eV with respect to the peak of which the area is calculated is S_oxide. In the following description, S_metal and S_oxide are expressed by a ratio (%) with respect to (S_metal+S_oxide).

In the bonded film 15, the oxidation degree may differ in accordance with a depth in a direction from the surface toward the exposed face 14. For example, it is preferable that the oxidation degree is higher when getting closer to the surface of the bonded film 15. In this case, it is not necessary to oxidize all of the bonded film 15. Therefore, it is possible to suppress the oxidation of another metal in the plated layer 22 or the like. On the other hand, it is difficult for the current to flow in the surface of the bonded film 15. Therefore, an effect of suppression of a leak current is achieved. From a viewpoint for effectively suppressing the degradation of the insulating resistance, it is preferable that the above-mentioned oxidation degree is 1.0 or more at the depth of ¼ toward the deepest part in the distribution of the bonded film 15 from the surface when distribution in the depth direction of the bonded film 15 bonded to the surface of the multilayer chip 10 is measured by the XPS (X-ray Photoelectron Spectroscopy Analysis). It is more preferable that the above-mentioned oxidation degree is 1.0 or more at the depth of ½. It is still more preferable that the above-mentioned oxidation degree is 1.0 or more at the depth of ¾.

A description will be given of the depth of the bonded film 15. As an example, the metal for plating included in the bonded film 15 is Sn and the dielectric layers 11 are barium titanate. In this case, with respect to Sn3d5, Ba3d5 and Ti2p, the XPS analysis in the depth direction is performed from the center portion toward inside of a portion that is of the side faces of the multilayer chip 10 and is covered with neither the external electrode 20a nor the external electrode 20b. An etching rate is not limited. For example, the measurement is performed with an etching being performed by an Ar sputtering with an accelerating voltage of 1 kV or 2 kV. At each measured point in the depth direction, background is subtracted from the photoelectron spectra of Sn3d5, Ba3d5r and Ti2p by the straight-line method, the Shirley method, the Tougaard method or the like. Peak areas are calculated. The calculated peak areas are S_Sn, S_Ba and S_Ti. The concentration C_Sn of Sn of each point is calculated by $C\_Sn=(S\_Sn/\alpha\_Sn)/\{(S\_Sn/\alpha\_Sn)+(S\_Ba/\alpha\_Ba)+(S\_Ti/\alpha\_Ti)\}\times 100\%$ with use of relative sensitivities $\alpha\_Sn$, $\alpha\_Ba$ and $\alpha\_Ti$ that are determined in accordance with photoelectron peaks. The relative sensitivity may be calculated with respect to each element with use of a standard sample. Alternatively, a recommendation value that is determined in advance by a device maker may be used as the relative sensitivity. When the concentrations C_Sn are calculated from the surface in order, the last measured point of which C_Sn is 1% or more is determined as the deepest portion of the distribution of Sn. This is because accuracy of quantifying a concentration by the XPS may be a several percent order and a concentration less than 1% cannot be distinguished from noise. When the deepest portion is determined, a half measurement point between the outermost surface and the deepest point is ½ point. A measurement point of ¼ depth from the outermost surface is ¼ point. A measurement point of ¾ depth from the outermost surface is ¾ point.

It is preferable that the bonded film 15 is formed on the exposed face 14 on all of the four side faces of the multilayer chip 10. In this case, the leak current of all of the four side faces of the multilayer chip 10 is suppressed. Therefore the effect of the suppression of the leak current is large.

The structure of the embodiment specifically achieves the effect when a distance between the external electrodes is short and the leak current is easily occurred. For example, when the distance between the external electrode 20a and the external electrode 20b is 0.1 mm or more and 0.7 mm or less, specific large effect is achieved. When the distance is 0.05 mm or more and 0.13 mm or less, larger effect is achieved. The distance is a distance between the external electrode 20a and the external electrode 20b at a position where the distance between the external electrode 20a and the external electrode 20b is the shortest.

Figure 5:
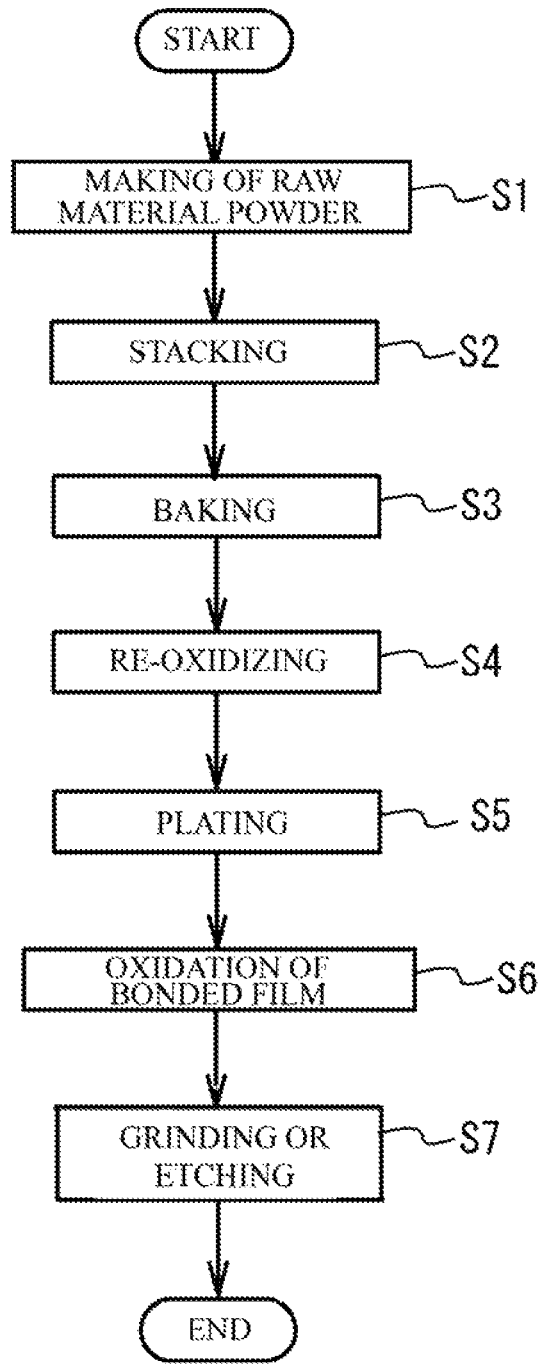
FIG. 5 illustrates a manufacturing method of a multilayer ceramic capacitor.

Next, a description will be given of a manufacturing method of the multilayer ceramic capacitor 100. FIG. 5 illustrates a manufacturing method of the multilayer ceramic capacitor 100.

(Making process of a raw material powder) Additive compound may be added to a ceramic powder material that is the main component of the dielectric layers 11, in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni, Li (lithium), B (boron), Na (sodium), K (potassium) and Si, or glass. Compound including additive compound is mixed with the ceramic material powders. The resulting ceramic powders are calcined. Then, the ceramic powders are wet-blended with the additive compound. After that, the ceramic powders with the additive compound are dried and crushed. And, desirable ceramic powder is prepared.

(Stacking Process) Next, a binder such as polyvinyl butyral (PVB) resin, an organic solvent such as ethanol or toluene, and a plasticizer are added to the resulting dielectric material and are wet-blended. With use of the resulting slurry, a strip-shaped dielectric green sheet with a thickness of 0.8 μm or less is coated on a base material by, for example, a die coater method or a doctor blade method, and then dried.

Then, a pattern of the internal electrode layer 12 is provided on the surface of the dielectric green sheet by printing conductive pastes for forming an internal electrode with use of screen printing or gravure printing. The conductive pastes include powders of a main component metal of the internal electrode layers 12, a binder, an solvent and additives if necessary. It is preferable that the binder and the solvent are different from those of the ceramic slurry. The ceramic material that is the main component of the dielectric layers 11 and acts as the co-material may be dispersed into the conductive paste.

Then, the dielectric green sheet on which the internal electrode layer pattern is printed is stamped into a predetermined size, and a predetermined number (for example, 200 to 500) of stamped dielectric green sheets are stacked while the base material is peeled so that the internal electrode layers 12 and the dielectric layers 11 are alternated with each other and the end edges of the internal electrode layers 12 are alternately exposed to both end faces in the length direction of the dielectric layer so as to be alternately led out to a pair of external electrodes of different polarizations. Cover sheets, which are to be the cover layers 13, are stacked on the stacked green sheets and under the stacked sheets and are thermally compressed. The resulting compact is cut into a predetermined size (for example, 1.0 mm×0.5 mm). Thus, a ceramic multilayer structure having a parallelepiped shape is formed.

After that, a metal conductive paste to the ground layer of the external electrodes 20a and 20b is coated on the both edge faces of the ceramic multilayer structure by a dipping method or the like and is dried. Thus, a compact of the multilayer ceramic capacitor 100 is obtained.

(Baking Process) The binder is removed from the compact in $N_2$ atmosphere of 250 degrees C. to 500 degrees C. The resulting compact is baked for 10 minutes to 2 hours in a reductive atmosphere in a temperature range of 1100 degrees C. to 1300 degrees C. Thus, each compound structuring the dielectric green sheet is sintered. And a grains of each compound grows.

(Re-oxidizing process) After that, the sintered structure may be subjected to a re-oxidizing process in $N_2$ gas atmosphere in a temperature range of 600 degrees C. to 1000 degrees C.

(Plating process) After that, with an electroplating process, the plated layer 22 is formed on the ground layer of the external electrodes 20a and 20b.

(Oxidation process of bonded films) In the plating process, the bonded film of the metal for plating is formed on the exposed face 14. And so, a process for oxidizing the bonded film is performed. In order to oxidize the bonded film, it is necessary to regulate a temperature condition, a humidity condition, an oxygen partial pressure condition and a thermal treatment time. It is possible to sufficiently oxidize the bonded film when the temperature is higher, the humidity is higher, the oxygen partial pressure is higher or the thermal treatment time is longer. It is therefore preferable that lower limits are determined with respect to the temperature, the humidity, the oxygen partial pressure and the thermal treatment time. On the other hand, when anyone of the parameters is excessively large, a thick oxide film may be formed on the plated layer 22. It is therefore preferable that upper limits are determined with respect to the temperature, the humidity, the oxygen partial pressure and the thermal treatment time. And so, in the embodiment, a thermal treatment is performed for 3 to 72 hours in an atmospheric air of 40 to 60 degrees C. and 80 to 100% RH. Alternatively, a thermal treatment is performed for 6 to 24 hours in an atmosphere of 140 to 160 degrees C. and an oxygen concentration of 1000 ppm or less (an oxygen partial pressure of $1.013 \times 10^2 = 101.3$ Pa or less in a case where an atmospheric pressure is $1.013 \times 10^5$ Pa). With the method, it is possible to oxidize the metal for plating bonded to the exposed face 14 during forming of the plated layer 22. The oxidation condition is not a strong oxidation condition. Therefore, oxidation of the external electrodes 20a and 20b is suppressed.

(Etching process or Grinding process) Next, the surface of the plated layer 22 is subjected to an etching or a grinding. It is therefore possible to remove an oxide formed on the surface of the plated layer 22 in the oxidation process of the bonded film. For example, it is preferable that the metal for plating of the plated layer 22 is exposed so that the multilayer ceramic capacitor 100 is surface-mounted.

With the manufacturing method of the embodiment, the oxidation process of the bonded film is performed. Therefore, it is possible to suppress the oxidation of the external electrodes 20a and 20b and sufficiently oxidize the metal for plating bonded to the exposed face 14 during the plating process. Therefore, the insulating resistance of the bonded film 15 is sufficiently enlarged. And it is possible to suppress the reduction of the insulating resistance of the multilayer ceramic capacitor 100. The bonded film 15 is formed by oxidizing the metal for plating. Therefore, it is possible to suppress the influence of the metal for plating by a simple method. Even if a part of the surface of the external electrodes 20a and 20b is oxidized, it is possible to suppress the influence on the surface mounting of the multilayer ceramic capacitor 100, by performing the etching process or the grinding process after the oxidation.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

The multilayer ceramic capacitors in accordance with the embodiment were made and the property was measured.

Examples 1 to 3

Necessary additive was added to barium titanate powders. The resulting powders were sufficiently wet-blended by a ball mil and were crushed. Thus, the dielectric material was obtained. An organic binder and a solvent were added to the dielectric material. And dielectric green sheets were made by a doctor blade method. The organic binder was polyvinyl butyral (PVB) resin or the like. The solvent was ethanol, toluene or the like. And a plasticizer and so on were added.

Next, the conductive paste for forming the internal electrode layer was formed. The conductive paste included a main component metal (Ni) powder of the internal electrode layer 12, a co-material (barium titanate), a binder (ethyl cellulose), a solvent and an auxiliary as needed.

The conductive paste for forming the internal electrode layer was screen-printed on the dielectric green sheet. 180 of the dielectric green sheets on which the conductive paste for forming the internal electrode layer was printed were stacked, and cover sheets were stacked on the stacked dielectric green sheets and under the stacked dielectric green sheets. After that, a ceramic multilayer structure was obtained by a thermal compressing. And the ceramic multilayer structure was cut into a predetermined size.

The binder was removed from the ceramic multilayer structure in $N_2$ atmosphere of 250 degrees C. to 500 degrees C. After that, the metal paste including the metal filler of which a main component was Ni, the co-material, the binder and the solvent was coated from the both edge faces to the side faces of the ceramic multilayer structure and was dried. After that, the resulting ceramic multilayer structure was baked together with the metal paste in a reductive atmosphere of $10^{-5}$ atm to $10^{-8}$ atm in a temperature range of 1100 degrees C. to 1300 degrees C. And, a sintered structure was formed.

The resulting sintered structure had a length of 1.0 mm, a width of 0.5 mm and a height of 0.5 mm. An average thickness of each of the dielectric layers 11 was 1.2 µm. After that, the sintered structure was subjected to a re-oxidation process at 600 degrees C. to 1000 degrees C. in $N_2$ atmosphere. After that, by a electroplating process, a Ni-plated layer and a Sn-plated layer were formed. Thus the plated layer 22 was formed.

After that, the oxidation process of the bonded film was performed with respect to the examples 1 to 3. In the example 1, the thermal treatment was performed for 48 hours in an atmospheric air of 60 degrees C. and 80% RH. Thus, the bonded film 15 on the exposed face 14 was oxidized. In the example 2, the thermal treatment was performed for 24 hours in an atmosphere of 150 degrees C. and an oxygen partial pressure of 101.3 Pa or less. In the example 3, the thermal treatment was performed for 3 hours in an atmospheric air of 40 degrees C. and 100% RH. In the comparative example, the thermal treatment was not performed after the formation of the plated layer 22.

After that, the oxidation degree of the bonded film 15 of the exposed face 14 was measured by performing the XPS (Quantera SXM made by ULVAC PHI) in a depth direction. The sputtering voltage was 2 kV. The data obtained by the XPS analysis was subjected to the following processes with use of "MultiPak" that was a data analysis software for the XPS made by ULVAC PHI. "Curve Fit" function was selected. "Shirley method" was selected as a background type. A binding energy range of 481.8 to 491.4 eV was designated, and the background was subtracted by the function of the software. Next, "Gauss-Lorentz" was selected as a fitting function. A provisional curved line of which a peak position was 484.5 eV for specifying S_metal and a provisional curved line of which a peak position was 486 eV for specifying S_oxide were made. The provisional curved lines were subjected to a curve fitting by executing a calculation. And, a line of a photoelectron spectrum was determined. Each peak line was calculated on the basis of the determined curved line in accordance with the function of the software.

Figure 6:
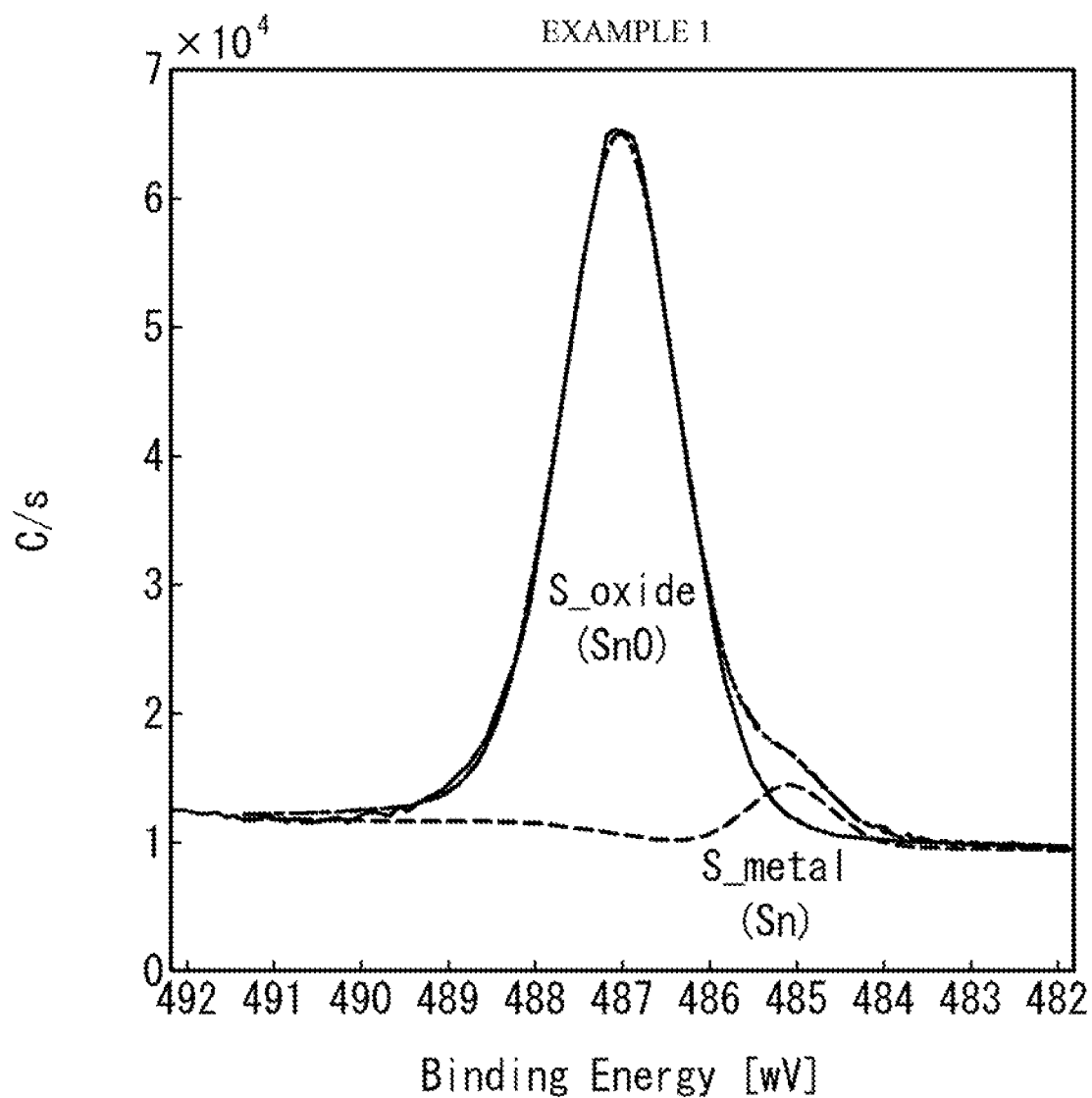
FIG. 6 illustrates a photoelectron spectrum of an outermost surface of a bonded film of an example 1.
Figure 7:
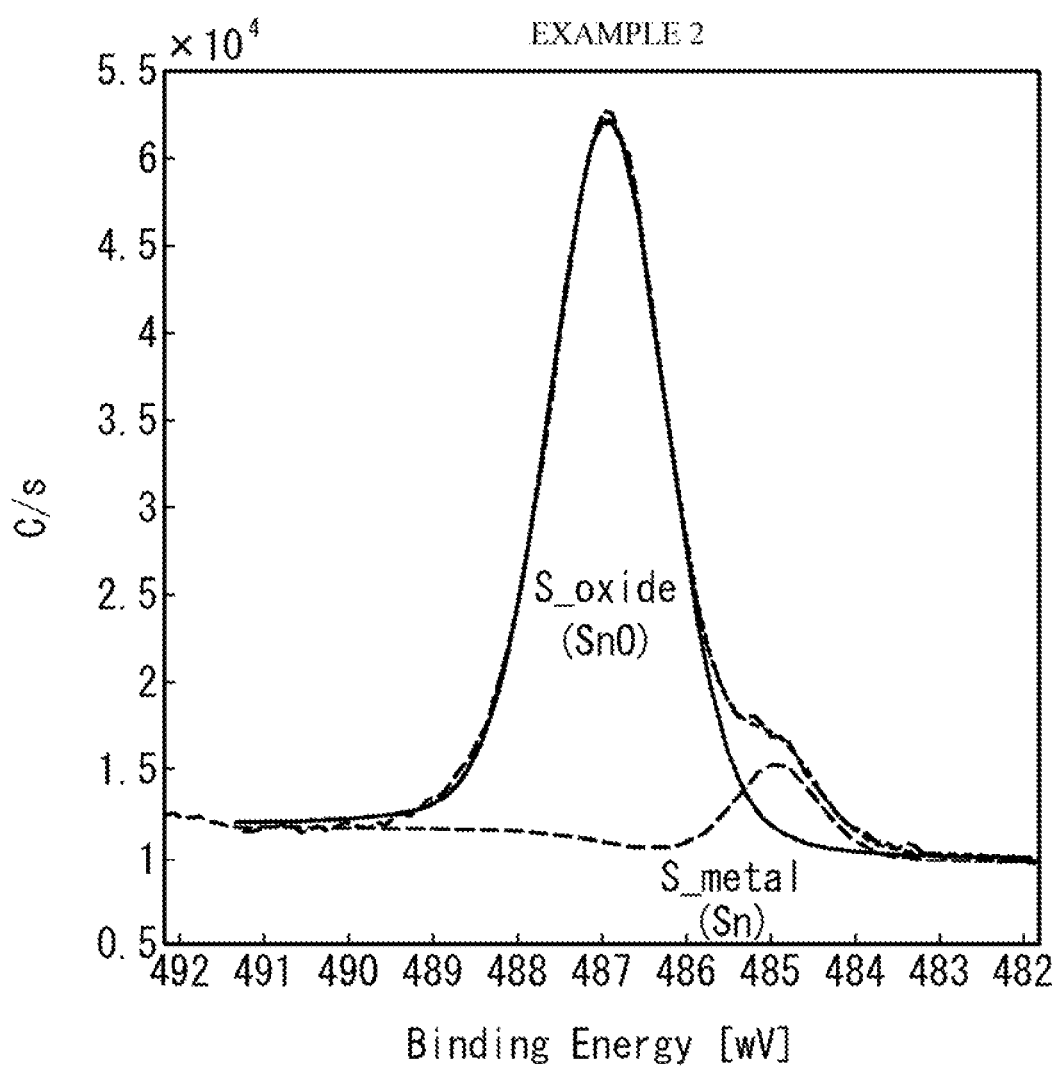
FIG. 7 illustrates a photoelectron spectrum of an outermost surface of a bonded film of an example 2.
Figure 8:
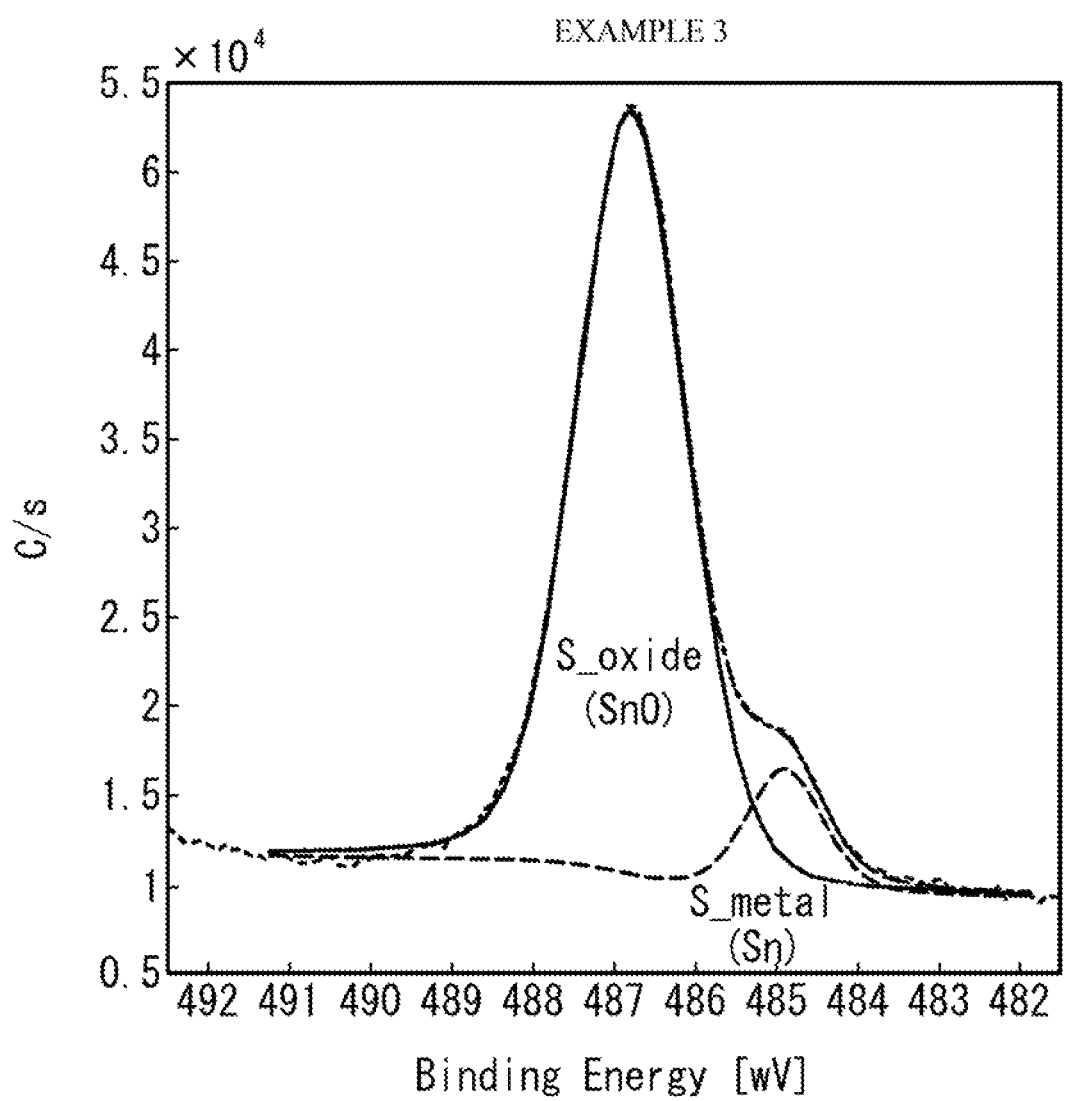
FIG. 8 illustrates a photoelectron spectrum of an outermost surface of a bonded film of an example 3.
Figure 9:
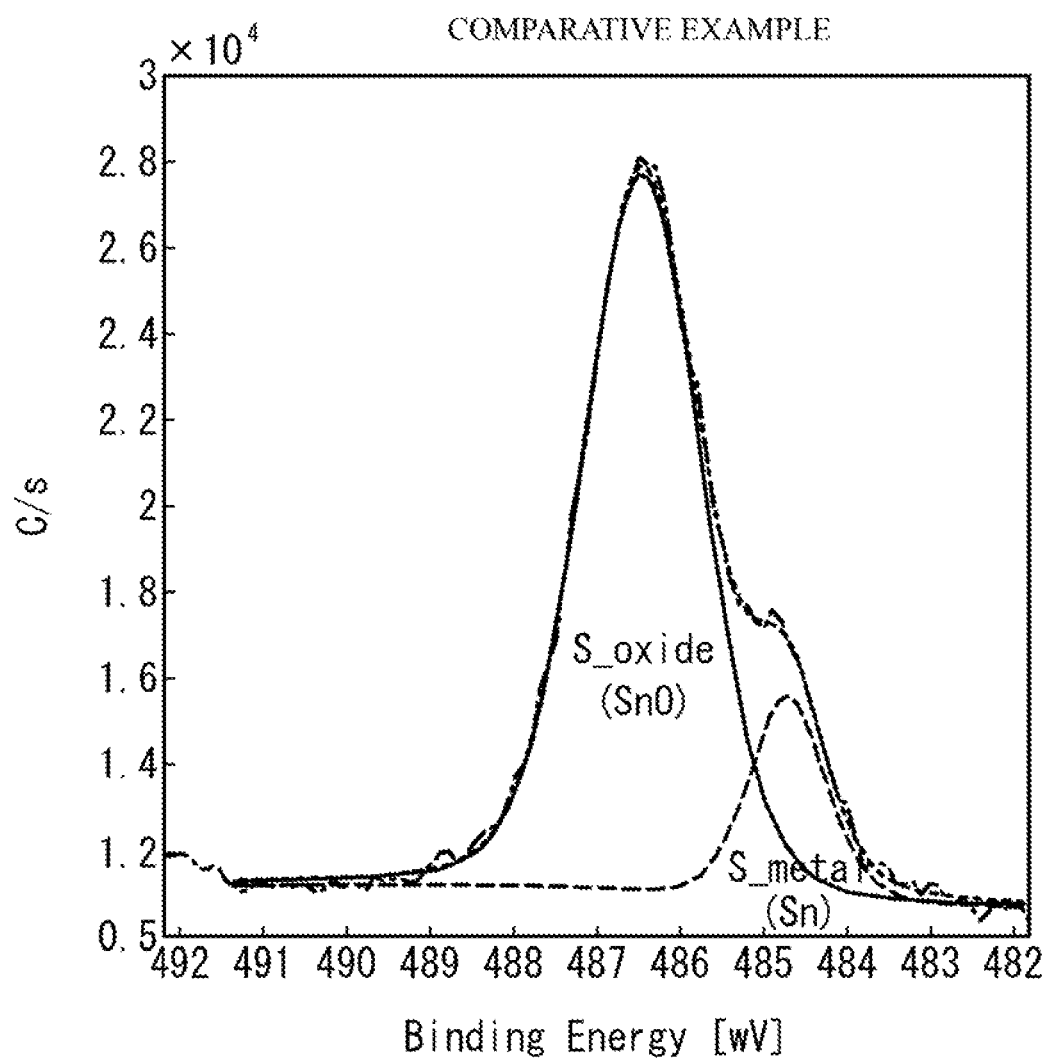
FIG. 9 illustrates a photoelectron spectrum of an outermost surface of a bonded film bonded to an exposed face of a comparative example.

FIG. 6 illustrates a photoelectron spectrum of the outermost surface of the bonded film 15 of the example 1. FIG. 7 illustrates a photoelectron spectrum of the outermost surface of the bonded film 15 of the example 2. FIG. 8 illustrates a photoelectron spectrum of the outermost surface of the bonded film 15 of the example 3. FIG. 9 illustrates a photoelectron spectrum of the outermost surface of the bonded film bonded to the exposed face 14 of the comparative example. In any of FIG. 6 to FIG. 9, photoelectron spectra of Sn and SnO were obtained.

Table 1 shows S_metal, S_oxide and the oxidation degree of the outermost surface of the bonded films of the examples 1 to 3 and the comparative example. As shown in Table 1, the oxidation degrees of the examples 1 to 3 were higher than that of the comparative example. It is thought that this was because the oxidation process of the bonded film was performed. The oxidation degree of the example 2 was higher than that of the example 3. The oxidation degree of the example 1 was higher than that of the example 2. It is thought that this was because the oxidizing power of the oxidation process of the bonded film of the example 2 was larger than that of the example 3 and the oxidizing power of the oxidation process of the bonded film of the example 1 was larger than that of the example 2.

TABLE 1

|  | S_oxide | S_metal | OXIDATION DEGREE |
|---|---|---|---|
| EXAMPLE 1 | 95.4 | 4.6 | 20.8 |
| EXAMPLE 2 | 94.2 | 5.8 | 16.2 |
| EXAMPLE 3 | 92.9 | 7.1 | 13.1 |
| COMPARATIVE EXAMPLE | 84.8 | 15.2 | 5.6 |

Figure 10:
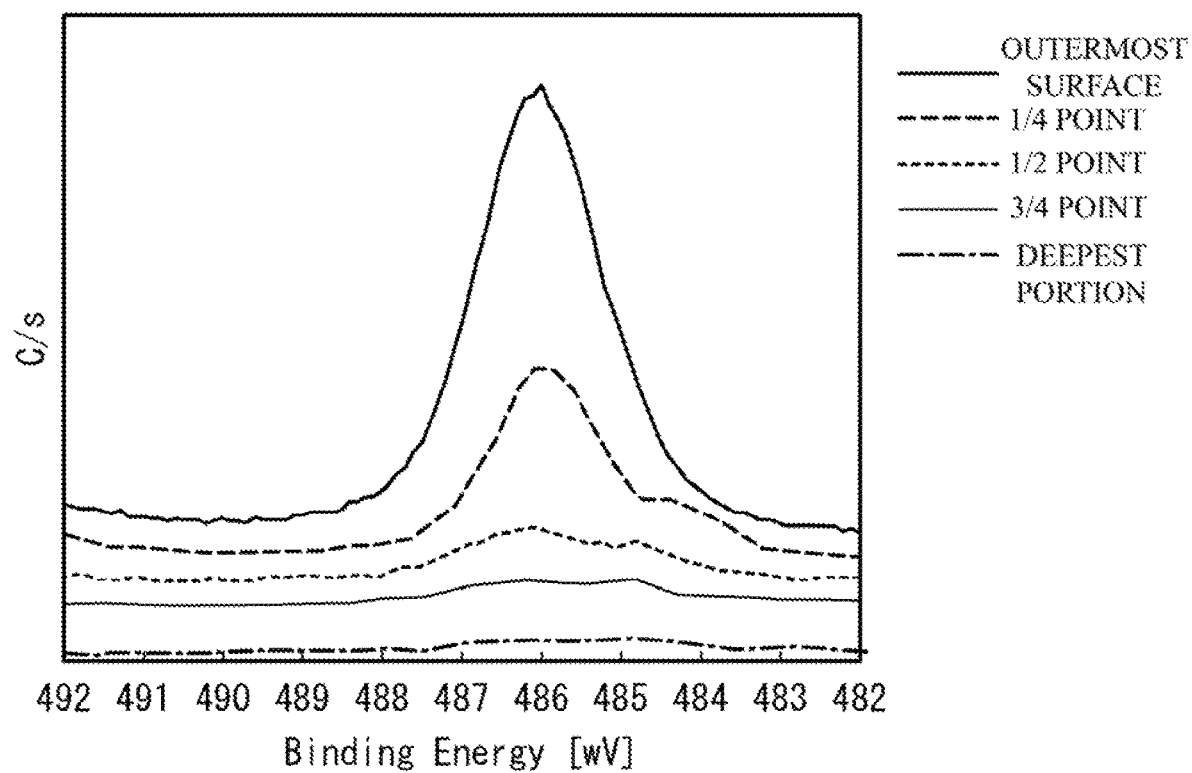
FIG. 10 illustrates a changing of a photoelectron peak of Sn3d5 of a bonded film of an example 1 from an outermost surface in a depth direction.

FIG. 10 illustrates a changing of the photoelectron peak of Sn3d5 of the bonded film 15 of the example 1 from the outermost surface in the depth direction. As illustrated in FIG. 10, the peak area of the photoelectron intensity is the largest at the outermost surface. The peak area of the photoelectron intensity got smaller along the depth direction. Therefore, it is possible to use the peak areas of the photoelectron intensity for defining ¼ point, ½ point and ¾ point.

Figure 11A:
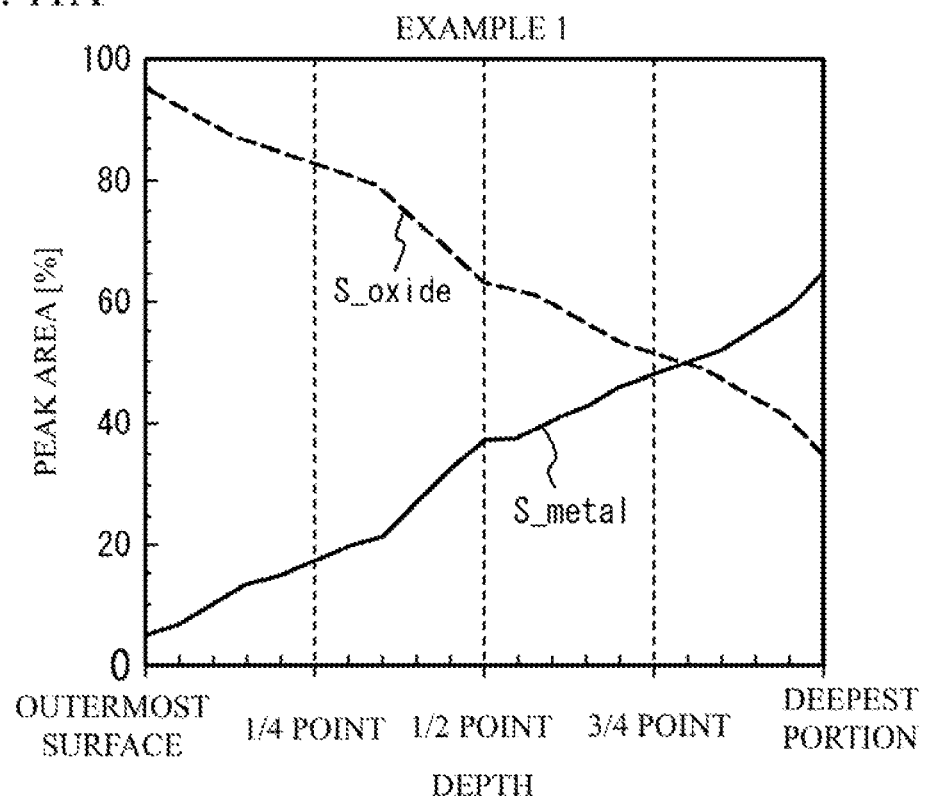
FIG. 11A illustrates a changing of S_metal and S_oxide at each depth of a bonded film 15 of an example 1.
Figure 11B:
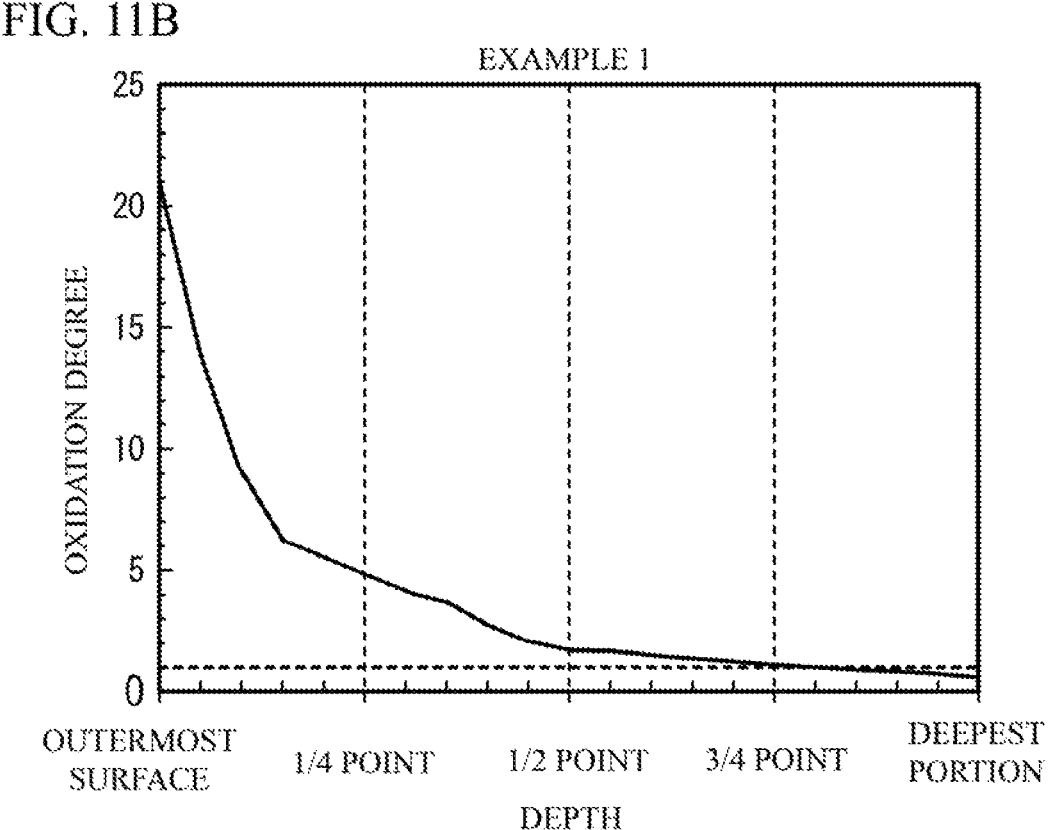
FIG. 11B illustrates an oxidation degree at each depth obtained from FIG. 11A.
Figure 12:
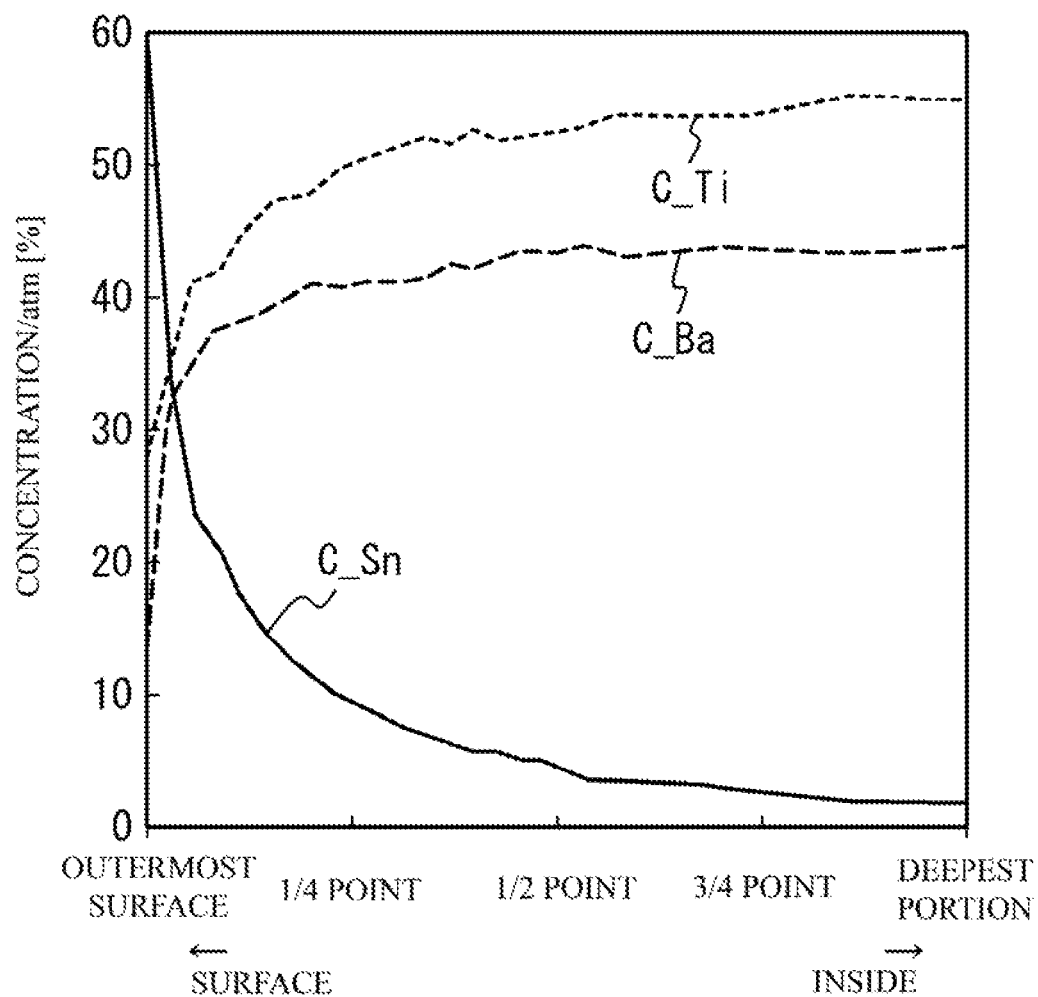
FIG. 12 illustrates a calculated concentration C_Sn of Sn at each measurement point.

FIG. 11A illustrates a changing of S_metal and S_oxide at each depth of the bonded film 15 of the example 1. FIG. 11B illustrates the oxidation degree at each depth obtained from FIG. 11A. As illustrated in FIG. 11A and FIG. 11B, S_oxide got smaller along the depth direction, and S_metal got larger along the dept direction. Therefore, the oxidation degree was the highest at the outermost surface. The oxidation got smaller along the depth direction. In this manner, a gradient occurred in the oxidation degree in the depth direction. In the example 2 and the example 3, it is thought that the oxidation degree was the highest at the outermost surface and the oxidation degree got smaller along the depth direction. FIG. 12 illustrates the calculated concentration C_Sn of Sn at each measurement point. C_Ti and C_Ba are respectively a Ti concentration and a Ba concentration at each measurement point. C_Ti is $(S\_Ti/\alpha\_Ti)/\{(S\_Ba/\alpha\_Ba)+(S\_Ti/\alpha\_Ti)+(S\_Sn/\alpha\_Sn)\} \times 100\%$. C_Ba is $(S\_Ba/\alpha\_Ba)/\{(S\_Ba/\alpha\_Ba)+(S\_Ti/\alpha\_Ti)+(S\_Sn/\alpha\_Sn)\} \times 100\%$. By using the results, it is possivke to define the depth of the bonded film 15.

Figure 13:
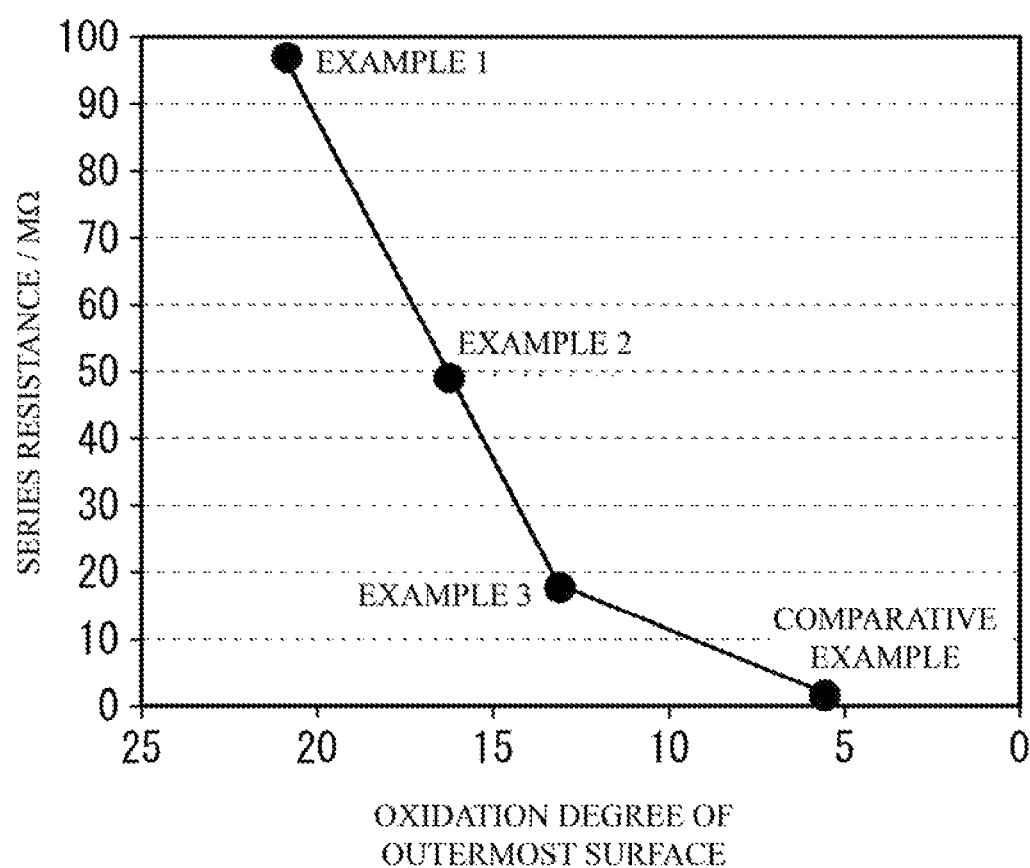
FIG. 13 illustrates measured results of series resistances.

Next, a series resistance of the multilayer ceramic capacitors 100 of the examples 1 to 3 and the comparative example was measured by an LCR meter with a voltage of 4 V being applied to the multilayer ceramic capacitors 100 for 60 seconds. Table 2 and FIG. 13 show the results. When the series resistance was 10 MΩ or more, it was determined as "good". When the series resistance was less than 10 MΩ, it was determined as "bad". The oxidation degrees and the series resistances at each depth were shown. As shown in Table 2 and FIG. 13, the examples 1 to 3 were determined as "good". On other hand, the comparative examples was determined as "bad". It is thought that this was because the oxidation degree of the outermost surface of the bonded film 15 was 13.1 or more in the examples 1 to 3, and a surface leak was suppressed. The series resistance of the example 2 was larger than that of the example 3. The series resistance of the example 1 was larger than that of the example 2. From the results, when the oxidation degree is higher, the series resistance gets higher.

TABLE 2

| | OXIDATION DEGREE | | | SERIES RESISTANCE (MΩ) |
| --- | --- | --- | --- | --- |
| | OUTERMOST SURFACE | ¼ POINT | ½ POINT | ¾ POINT | |
| EXAMPLE 1 | 20.8 | 4.8 | 1.7 | 1.1 | 97 |
| EXAMPLE 2 | 16.2 | 3.4 | 1.2 | 0.8 | 49 |
| EXAMPLE 3 | 13.1 | 2.6 | 0.8 | 0.7 | 18 |
| COMPARATIVE EXAMPLE | 5.6 | 0.3 | 0.1 | — | 1.7 |

Although the embodiments of the present invention have been described in detail, it is to be understood that the various change, substitutions, and alterations could be made hereto without departing from the spirit and scope of the invention.

What is claimed is:

1. A ceramic electronic device comprising:
a ceramic main body that has at least two edge faces facing each other, has an internal electrode layer inside thereof and has a parallelepiped shape; and
external electrodes formed on the two edge faces, wherein:
the external electrodes have at least a plated layer;
an oxide film of a metal for plating of the plated layer on a region that is a part of at least one of four side faces of the ceramic main body other than the two edge faces, the region not being covered with the external electrodes; and
a ratio of (a peak area of an oxide of the metal for plating)/(a peak area of the metal for plating) is 13.1 or more in a photoelectron spectrum of an outermost surface of the oxide film.

2. The ceramic electronic device as claimed in claim 1, wherein the ratio changes along a depth direction of the oxide film from the outermost surface.

3. The ceramic electronic device as claimed in claim 1, wherein the ratio is 1 or more at ¼ of the depth from the outermost surface.

4. The ceramic electronic device as claimed in claim 1, wherein the oxide film is formed on all of the four side faces.

5. The ceramic electronic device as claimed in claim 1, wherein a distance of the external electrodes is 0.1 mm or more and 0.7 mm or less.

6. The ceramic electronic device as claimed in claim 1, wherein a distance of the external electrodes is 0.05 mm or more and 0.13 mm or less.

7. The ceramic electronic device as claimed in claim 1, wherein the metal for plating is Sn.

8. The ceramic electronic device as claimed in claim 7, wherein the peak areas are obtained by using "MultiPak" that is a data analysis software for XPS made by ULVAC PHI, selecting "Curve Fit" function, selecting "Shirley method" as a background type, designating a binding energy range of 481.8 to 491.4 eV, subtracting background by a function of the data analysis software, selecting "Gauss-Lorentz" as a fitting function, making a provisional curved line of which a peak position is 484.5 eV for specifying the peak area of the metal for plating and a provisional curved line of which a peak position is 486 eV for specifying the peak area of the oxide of the metal for plating, performing a curve fitting by executing a calculation, determining a line of a photoelectron spectrum, and calculating each peak line on a basis of curved lines obtained by the performing of the curve fitting, in accordance with the function of the software.

9. A manufacturing method of a ceramic electronic device comprising:
preparing a ceramic main body that has at least two edge faces facing each other, has an internal electrode layer inside thereof, has a parallelepiped shape and has ground layers formed from the two edge faces toward at least one of four side faces of the ceramic main body other than the two edge faces, a main component of the ground layer being a metal;
forming a plated layer on the ground layer by a plating process; and
oxidizing a surface of a bonded film of a metal for plating after the plating process, the bonded film being spaced from the ground layer.

10. The method as claimed in claim 9, further comprising:
removing an oxide formed on the plated layer after the oxidizing, by an etching or grinding.

* * * * *